Aug. 14, 1928.
B. D. HORTON
UNIVERSAL ADAPTER
Filed May 20, 1927
1,680,787
4 Sheets-Sheet 1
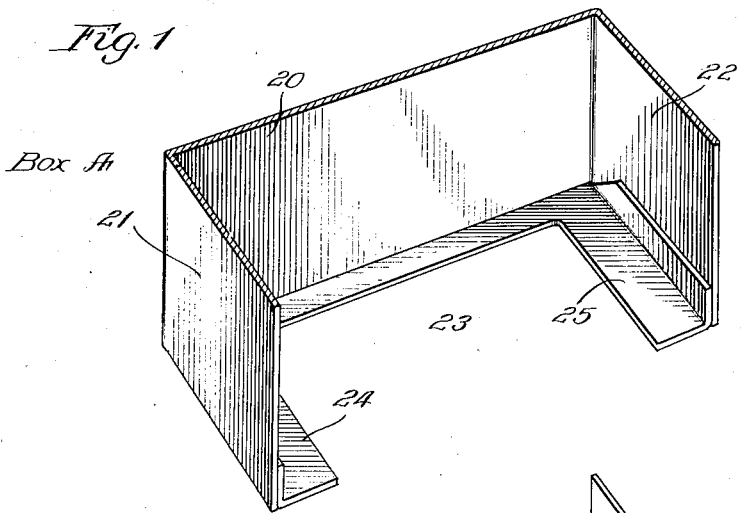
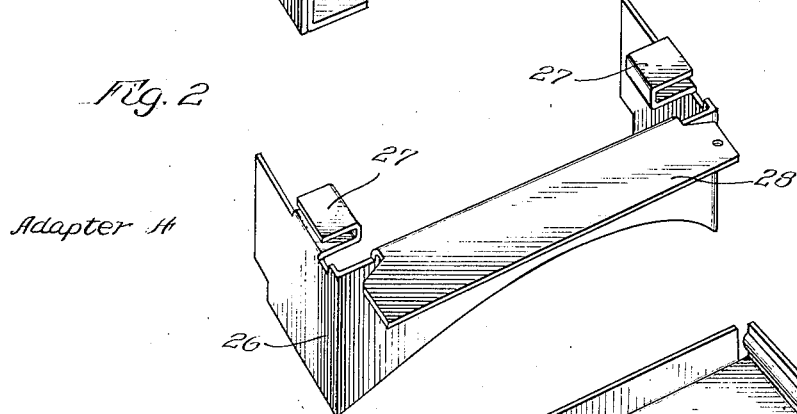
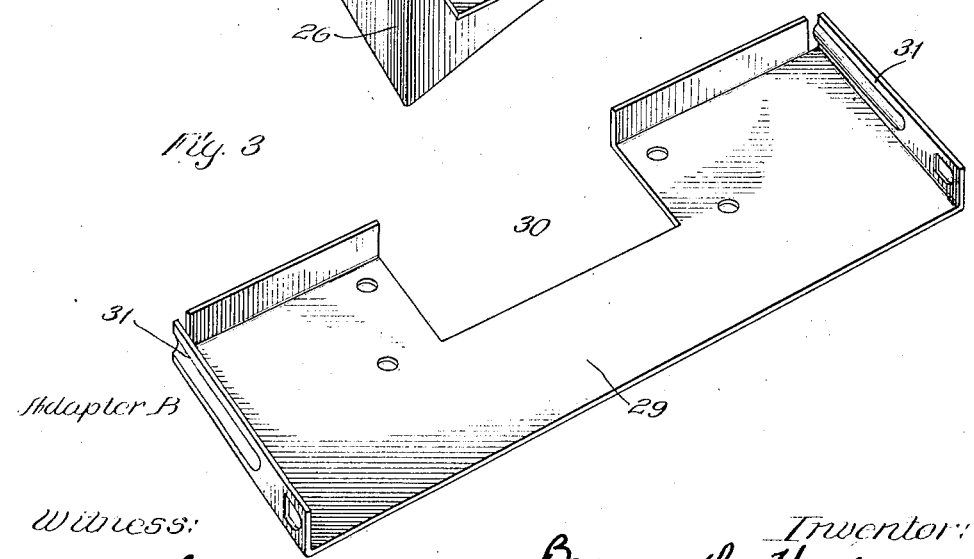

Aug. 14, 1928.
B. D. HORTON
UNIVERSAL ADAPTER
Filed May 20, 1927
1,680,787
4 Sheets-Sheet 2
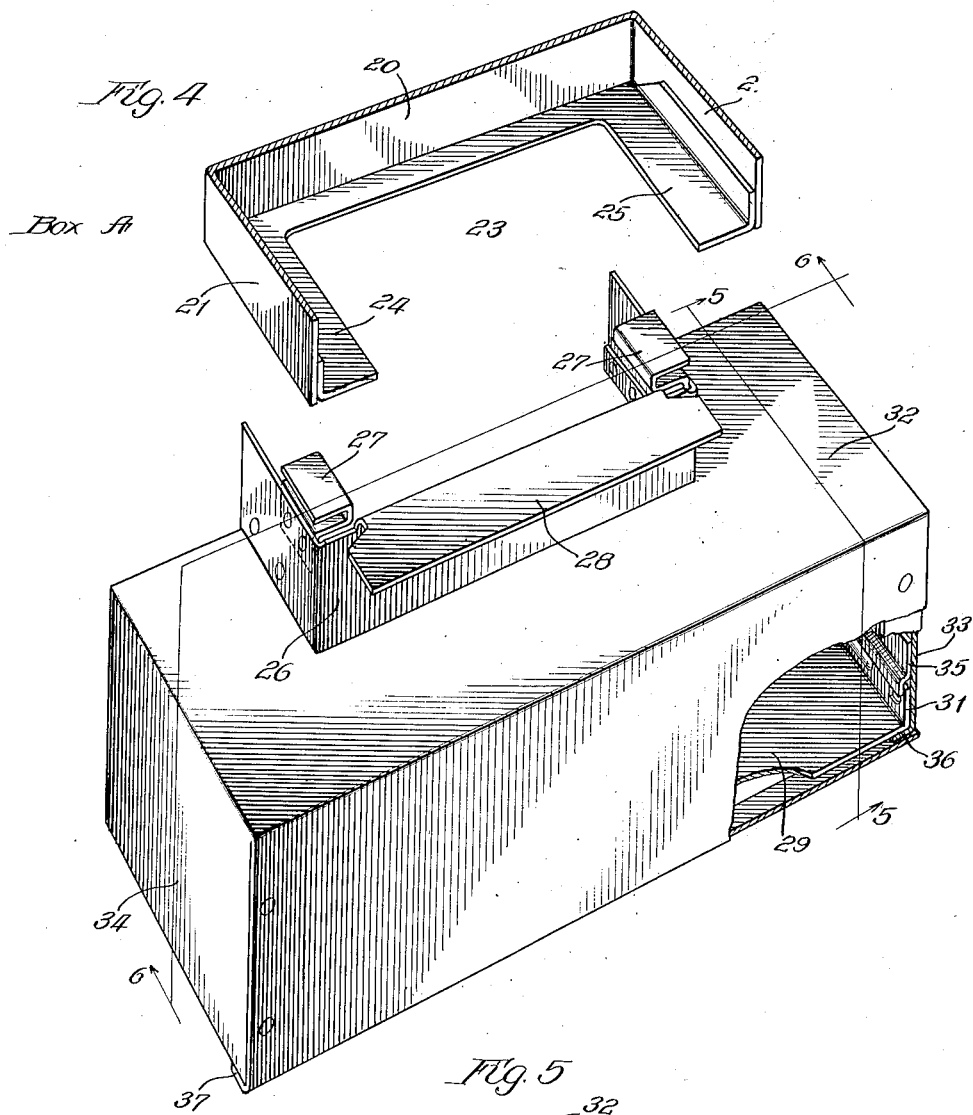

Aug. 14, 1928.
B. D. HORTON
1,680,787
UNIVERSAL ADAPTER
Filed May 20, 1927 4 Sheets-Sheet 3
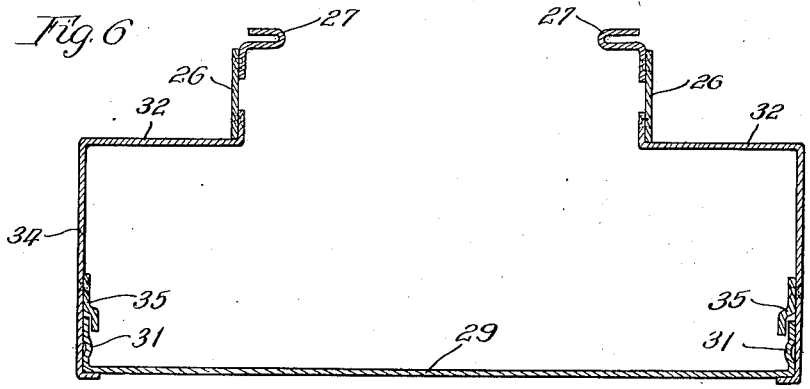
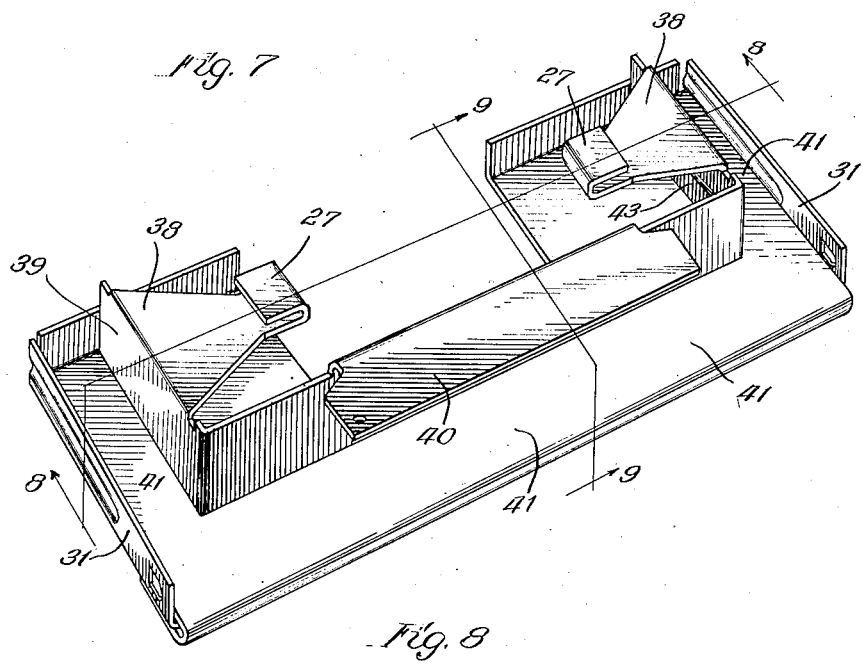
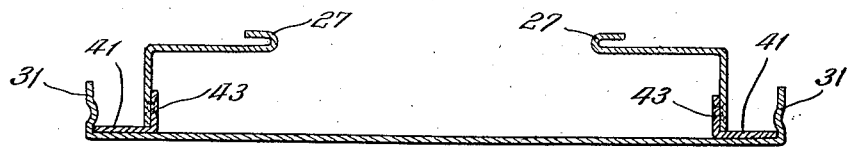
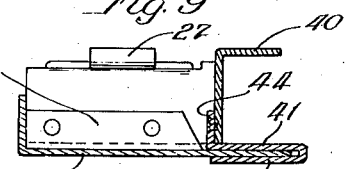

Aug. 14, 1928.
B. D. HORTON
1,680,787
UNIVERSAL ADAPTER
Filed May 20, 1927
4 Sheets-Sheet 4
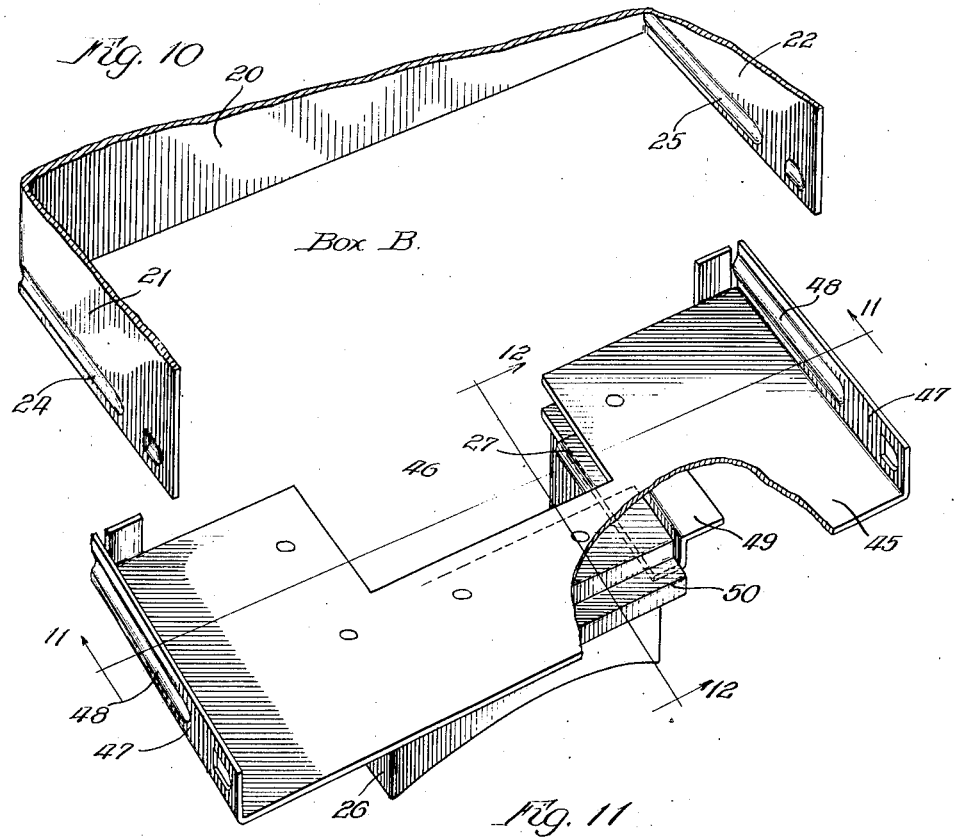
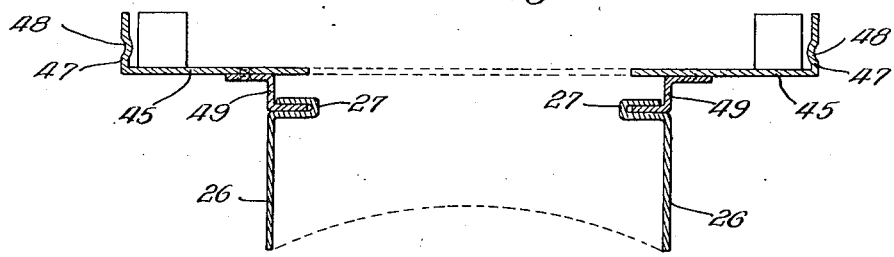

Patented Aug. 14, 1928.

1,680,787

UNITED STATES PATENT OFFICE.

BRYSON D. HORTON, OF DETROIT, MICHIGAN, ASSIGNOR TO SQUARE D. COMPANY, OF DETROIT, MICHIGAN, A CORPORATION OF MICHIGAN.

UNIVERSAL ADAPTER.

Application filed May 20, 1927. Serial No. 193,043.

My invention relates to devices employed in connection with switching apparatus and it has particular relation to devices which are known as adapters and which are utilized to afford a sheltered chamber between a meter and a switch box containing circuit controlling apparatus.

More particularly my invention relates to devices of the above character which are utilized to so reconcile the difference between certain boxes and certain meter devices or adapters that whichever device or box is adopted may be so harmonized to a line of other devices that the same may be thereafter associated together in the same manner as if the two lines were made for each other.

Because of the present unsettled condition of standards, there have been attempts by certain groups of users of electric switching apparatus to standardize on a certain box containing circuit controlling apparatus which would be adapted to receive anyone of a certain line of meter adapters or meters. That is, they desired to install on a customer's premises, a box having such characteristics that anyone of a large number of meters could be associated therewith. Further, it was desired to so associate these meters with a box that the wires extending between the two would be amply protected and that, moreover, theft of current from the system, between the meter and the switch points, would be prevented. In order to accomplish this, the box would be provided with an opening and it is further presumed that anyone of the meter adapters or meters, which it is desired to fit into such an opening would have portions thereof of a suitable size to permit of this interfitting.

If it is assumed that a box of some other manufacture be installed on the customer's premises, it is obvious that unless this latter box has the same opening and adapter-receiving characteristics as the previously discussed box, it cannot be used with the line of meter adapters or meters with which the first-discussed box was designed to function. In other words, in the absence of proper standardization, it is obvious that meter adapters or meters which will fit one box will not fit the other box and vice versa.

The primary purpose of my invention, therefore, contemplates the provision of universal adapters or harmonizing members so constructed that the meters or adapters of one line may be associated with the boxes of another line and vice versa, and it will be apparent that, by the use of my novel universal adapter, a considerable step is taken in the direction of economy since it is no longer necessary, simply because one section of the country has adopted a particular box, to, at the same time, accept the line of meter adapters which are suggested as interfitting with such a box. As a matter of fact, however, this is exactly the situation which now exists in the absence of a device as contemplated by my invention.

In some parts of the country customers are using one class of box and desire to use another class of meter adapter. But, on the other hand, another section of the country has to some extent adopted a particular line of meters and meter adapter and does not desire to be forced to use the boxes which those adapters were constructed to fit, it being a matter of individual taste and subject to widely varying conditions as to what particular box or adapter may best answer the requirements of certain localities.

This forced utilization of boxes or adapters is eliminated by the use of my universal adapters since these latter are so constructed that no matter which end of the system is standardized the other device, be it the box or the meter-receiving hood or adapter, can be selected according to individual taste and is not forced upon the consumer because he happens to have installed on his premises a certain make of box or meter.

The manner in which I accomplish the above objects, together with other desirable advantages of my invention, will be best understood from a consideration of the hereinafter description of my invention, taken in connection with the accompanying drawings, in which—

Figure 1 is a fragmentary perspective view of one box;

Fig. 2 is a perspective view of a meter adapter which may be fitted directly to the box shown in Fig. 1;

Fig. 3 is a perspective view of a meter adapting element which it is desired to associate with the box of Fig. 1, but which is not constructed with that purpose in view;

Fig. 4 is a perspective disassembled view;

of the manner in which a box of the type shown in Fig. 1 is adapted to receive a meter protective element as shown in Fig. 3, the box and meter adapter aggregate being disassembled to more clearly show the construction thereof;

Fig. 5 is a sectional view taken on the line 5—5 of Fig. 4;

Fig. 6 is a sectional view taken on the line 6—6 of Fig. 4;

Fig. 7 is a perspective view of an adapter aggregate which is analogous to that shown in Fig. 4 and is shown assembled so as to be applied to the box shown in Fig. 4;

Fig. 8 is a sectional view taken on the line 8—8 of Fig. 7;

Fig. 9 is a sectional view taken on the line 9—9 of Fig. 7;

Fig. 10 is a disassembled view of a box of another design and a meter adapting aggregate whereby said box may receive a meter adapter of the form shown in Fig. 2, it being understood that this aggregate is fitted to the end of the box shown, but that, for clarity of illustration, this interfitting is not made in the figure;

Fig. 11 is a sectional view taken on the line 11—11 of Fig. 10, and

Fig. 12 is a sectional view taken on the line 12—12 of Fig. 10.

Referring now more particularly to the drawings, and for purpose of illustration, the box shown in Fig. 1 will be designated box A, while that shown in the upper portion of Fig. 10 will be designated box B. In this connection it should be understood that only the ends of these boxes are shown, it being understood, of course, that these boxes are completed with walls and bottom, and preferably hinged covers, and that they are adapted to have circuit controlling devices mounted therewithin. When these boxes are installed in a building, it may be desirable to associate therewith, or in close proximity thereto, a meter, and it may be further desired that a portion of such meter extend through an opening in such box for the protection of the leads extending between said meter and said switch-containing box. The various manufacturers of such switch boxes therefore furnish elements known as meter adapting elements which are so provided with attaching means that they can be secured in position at those ends of the switch box which are discontinuous. A meter adapting hood which may be attached to the end of the box A is shown in Fig. 2, and may be designated as meter adapter A.

The box A comprises a back or bottom 20, and walls 21 and 22. The walls are discontinuous at the end of the box, whereby an aperture 23 is formed which has flanges 24 and 25 sub-tending the end of the box. The adapter A comprises a hood portion 26 which is of such a form that a portion of a meter may be snugly received therein, and which is provided with tangs 27 which slide down over the flanges 24 and 25 and serve to secure the hood portion 26 in juxtaposed relation with the opening 23. When the hood is in position a portion 28 forms the remainder of the end wall and completely closes the end of the box.

Referring now to Fig. 10, box B likewise comprises a back or bottom 20, and side walls 21 and 22. Instead of flanges, these side walls are provided with beaded portions 24 and 25 which serve to receive the end wall portion or meter adapter. In Fig. 3 is illustrated an adapter, which may be designated adapter B, and which is so formed that it will fit into the discontinuous end portion of box B and serve to protect the portion of a meter which projects therethrough.

This adapter comprises a flat portion or plate 29 which is apertured at 30 to form a hood-like member analogous to the hood 26 of the adapter A. Channels 31—31 are turned at the side of the plate 29 and fit over the beaded portions 24—25, of box B whereby said adapter B may be seated in the discontinuous wall portion to provide for the reception of a meter portion.

From the foregoing description of the manner in which the switch box and associable meter adapting elements, are constructed, it is obvious that a great deal of confusion arises. If one switch box, for instance, box B, is installed on the premises it follows that only the meter adapter which is designed for use with that box may be associated therewith. Such limitation of the adapters which can be used with said box may be extremely disadvantageous in that the meters which a party possesses may not interfit with said adapter, in the illustrated case with adapter B. Therefore, it is necessary to revise the entire line of devices in accordance with the dimensions of the one portion of the equipment—namely the box itself.

On the other hand, a party may possess a certain meter adapter, for instance, adapter A, and desire to associate the same with box B. Obviously, such a thing is impossible in the present state of the art and it is, therefore, apparent that, in the absence of standard equipment, a great deal of forced use of the various elements may exist.

The object of my invention, therefore, is to provide means which shall enable the association of adapter A with box B or of adapter B with box A. It is, of course, understood that the present illustration is merely exemplary of my invention and that many other boxes and adapters can be interchanged by providing universal couplers which follow my invention in that they have one side adapted to be received in a box of one kind, whereas the other side thereof is adapted to receive a meter adapting element of another kind.

For instance, reference may be had to Fig. 4 wherein I have illustrated a universal adapter or coupling device constructed in accordance with my invention. In this instance, the device comprises a box-like compartment 32 which has secured thereto at one end a structure which is adapted to be attachable to a box as is the adapter illustrated in Fig. 2. The tangs 27—27 are adapted to slide over the flanges 24 and 25 of the box illustrated, the latter being analogous to the box A heretofore described. The other end of the compartment 32 is open and the side walls 33—34 thereof are interiorly provided with grooves 35 into which the portions 31—31 of adapter B may be disposed. It will be further noted that the top and side walls of the compartment are turned over to further secure the wall 29 in position. The turned-over edges of the side walls are designated at 36, whereas the top is turned down at 37.

From the above description, it will be observed that a box such as box A may be made to receive an adapter of an entirely different line by placing between the box and the adapter a coupling or harmonizing member which is of the character described and which reconciles the differences between the two different devices.

In Fig. 7 to 9 inclusive I have illustrated a modified form of my coupling device whereby the adapter B may be associated with the box A which is very compact in form and which takes up substantially no more room than does the adapter itself. In this form of coupling device, as best shown in Fig. 7, the tanks 27 are formed integrally with wing portions 38 bent from a body 39. This body 39 also has an upwardly extending wing 40, and it should be observed that the entire structure so far described, is integrally formed after the contour thereof is stamped from the piece of metal. Another integrally formed member comprises a base portion 41 which is turned over at 42 to form a groove to receive a portion of the adapter member, side portions 43—43, and a longitudinally extending portion 44, said last two portions being bent at right angles from this last mentioned sheet of metal, whereby the same is secured to the first disclosed portion. In other words, the entire coupling member is formed from two stampings which are ultimately welded or otherwise secured together to form a complete device. This form of coupler is secured to the flanges 24 and 25 at the end of box A through the medium of the tangs 27, as heretofore described.

The adapter shown in Fig. 3 is attached to the coupler of Fig. 7 by sliding said adapter in between the face portion 41 and the over-turned edge of said coupler. The portions 31—31 are, of course, rigidly held by the edges of the part 41 and when this aggregate is attached to the box A, the adapter B is held in correct position, since it is assumed that the boxes are normally mounted upon the wall or other supporting surface.

Let us assume now that it is desired to associate an adapter of the character shown in Fig. 2, that is, adapter A, with a box of entirely different characteristics, for instance, with box B. To accomplish such an association, I provide a coupling member which is of the form shown in Fig. 10. This member comprises a face portion 45 of sheet metal provided with an aperture 46 and having its turned-over ends 47 provided with grooves 48 which cooperate with the beads 24 and 25 so that the coupler will slide into position and close the discontinuous end wall of the box B. On the face of the portion 45 are secured two side groove members 49—49 which are adapted to receive the tangs 27 of the adapter A. The top wing 28 of the adapter A is limited in its upper position by a longitudinally extending groove 50 which is likewise secured to the face of the portion 45. Therefore, when the adapter A is secured in position on the coupler member as shown in Figs. 10 to 12, inclusive, said coupler may be associated with the end of the box B, whereby the adapter A is to all intents and purposes associated with the box B and any advantages which may be inherent in such association are realized. From the above description of my invention, it will be evident to those conversant with this art, that a great many advantages may be realized by having on hand universal adapters or coupling devices such as I have described, and by utilizing these couplers to effect the association between the boxes and adapters of wholly different construction. Moreover, as I have especially pointed out in describing the coupler shown in Fig. 7, the latter may be constructed, by following my invention, with a minimum number of parts. As illustrated in the embodiment of my invention referred to, they may be composed entirely of stampings whereby the labor in the making of the same is reduced to a minimum.

While I have illustrated but two embodiments of my invention, it is obvious that the same accomplishes an entirely new result and I desire, therefore, that the invention be broadly interpreted and limited only by the scope of the appended claims and the showing of the prior art.

Having thus described my invention, what I claim as new and desire to secure by Letters Patent of the United States is:

1. In combination with switch boxes having openings in the ends thereof, the opening in one box being formed by the omission of substantially the entire wall and the opening in the other box being formed by cutting away but a portion of said end wall, there being adapter devices associable with each of said boxes, convertible hood means for so altering the openings in the ends of said boxes that an adapter intended for said first box may be associated with said second defined box and vice versa.

2. In combination with a switch box having an opening in the end wall portion thereof and adapted to receive certain meter adapters, converting means attachable to said end wall portion whereby an adapter designed for use with another box, and, therefore, not normally connectible to said first mentioned switch box, may be operatively joined to said first switch box.

3. In combination with switch boxes of one series and meter adapters of such characteristics that they are originally connectible with said boxes to provide for the protective association of meters with said boxes, and switch boxes of another series also having meter adapters associable therewith, the adapters, however, not being connectible to boxes other than those for which they were originally intended, harmonizing or converting means attachable to boxes of one series and having means to receive adapters of another series to provide an operative connection between boxes and adapters not originally connectible.

4. In combination with a box adapted to contain circuit controlling apparatus, said box having an opening of a certain size therein, an adapter device intended for connection with a different box and not, therefore, being directly connectible to said first mentioned box, means to adjust the difference between the first box and said adapter comprising a member having a portion adapted to be secured in operative relation with said box opening and having another portion to receive in operative relation said adapter device, whereby said first box and said adapter, although not originally connectible to each, are operatively combined.

5. In combination with a box adapted to contain circuit controlling apparatus, said box having an opening cut in the end wall thereof and an adapter device comprising a member forming the entire end wall of a certain size box and unsuitable for association with said box opening, a unitary member having a hood portion provided with securing means adapted to fit into said box opening and further provided with an open ended portion which receives said adapter device.

6. In combination with a box adapted to contain circuit controlling apparatus, said box having an opening cut in the end wall thereof and an adapter device comprising a member forming the entire end wall of a certain size box and unsuitable for association with said box opening, a unitary member having a hood portion provided with wing flanges extending parallel to the box end wall and adapted to fit within the opening in the latter to secure said member to said box and further provided with an open-ended portion having means around the edge thereof to receive said adapter device.

7. In combination with a box for containing a circuit controlling device, said box having an open end which may be closed by a wall portion having securing flanges bent at right angles thereto, an adapter device provided with securing flanges bent parallel to the body thereof, and a harmonizing member insertible between said box and said adapter whereby the two may function operatively.

8. In combination with a box for containing a circuit controlling device, said box having an open end which may be closed by a wall portion having securing flanges bent at right angles thereto, an adapter device provided with securing flanges bent parallel to the body thereof, and a harmonizing member insertible between said box and said adapter and having a portion thereof provided with means for securing said member to the open end of said box and further having an opening to receive the flanges of said adapter device.

9. In combination with a box for containing a circuit controlling device said box having an open end which may be closed by a wall portion having securing flanges bent at right angles thereto, an adapter device provided with securing flanges bent parallel to the body thereof, and a harmonizing member insertible between said box and said adapter and having a portion thereof provided with flanges bent at right angles to the body thereof for securing said member to the open end of said box and further having an opening to receive the flanges of said adapter.

10. In combination with a box for containing a circuit controlling device, said box having an open end which may be closed by a wall portion having securing flanges bent at right angles thereto, an adapter device provided with securing flanges bent parallel to the body thereof, and a harmonizing member insertible between said box and said adapter and having a portion thereof provided with means for securing said member to the open end of said box and further having an opening surrounded by channelled portions to receive the flanges of said adapter device.

11. A universal adapter element comprising two integrally formed members, and each of which is initially stamped of proper contour, one of said members having tangs formed thereon to provide for connecting said adapter element to a box, and the other of said members having attaching flanges formed thereon to permit the joining of the two members and further being provided with means for attaching an adapter thereto, said last named adapter not normally being connectible in said box, and the integrally formed members of said universal adapter functioning to harmonize the adapter element and the switch box so that the adapter, although not normally connectible to said box, may be operatively joined through the medium of said universal element.

12. A universal adapter member to provide for the operative connection of adapters of one series with boxes of another series, the last named adapters and boxes not being originally connectible, comprising two portions which are joined, one of said portions having means for connecting said member to the box and the other of said portions having means for receiving the adapter which was not originally connectible with said box.

In witness whereof, I have hereunto subscribed my name.

BRYSON D. HORTON.